United States Patent
Mahabir et al.

(10) Patent No.: US 9,912,686 B2
(45) Date of Patent: Mar. 6, 2018

(54) METHODS AND SYSTEMS FOR ENHANCING DATA SECURITY IN A COMPUTER NETWORK

(71) Applicant: Tracker Networks Inc., Toronto (CA)

(72) Inventors: Roger Ramchand Mahabir, Toronto (CA); Jason Doel, Newmarket (CA); Mesbah Abdulrahem, Guelph (CA); Peter Grys, Richmond Hill (CA); Loren Hicks, Toronto (CA)

(73) Assignee: Tracker Networks Inc., Toronto (CA)

( * ) Notice: Subject to any disclaimer, the term of this patent is extended or adjusted under 35 U.S.C. 154(b) by 142 days.

(21) Appl. No.: 15/046,660

(22) Filed: Feb. 18, 2016

(65) Prior Publication Data
US 2017/0244740 A1 Aug. 24, 2017

(51) Int. Cl.
*H04L 29/06* (2006.01)
*G06Q 20/40* (2012.01)

(52) U.S. Cl.
CPC ..... *H04L 63/1433* (2013.01); *G06Q 20/4016* (2013.01); *H04L 63/0428* (2013.01)

(58) Field of Classification Search
CPC . H04L 63/20; H04L 63/1433; H04L 63/1441; H04L 63/0428; G06Q 10/0635; G06Q 20/4016; G06F 21/55; G06F 21/577; G06F 2221/03; G06F 2221/033; G06F 2221/034
USPC .......................................................... 726/25
See application file for complete search history.

(56) References Cited

U.S. PATENT DOCUMENTS

| | | | | |
|---|---|---|---|---|
| 7,096,502 | B1* | 8/2006 | Fox | H04L 41/28 |
| | | | | 707/999.008 |
| 2004/0006704 | A1* | 1/2004 | Dahlstrom | G06F 21/577 |
| | | | | 726/25 |
| 2011/0119106 | A1* | 5/2011 | Dahl | G06Q 10/06 |
| | | | | 705/7.28 |
| 2014/0189873 | A1* | 7/2014 | Elder | G06F 21/577 |
| | | | | 726/25 |
| 2015/0237065 | A1* | 8/2015 | Roytman | H04L 63/1408 |
| | | | | 726/25 |

* cited by examiner

*Primary Examiner* — Yogesh Paliwal
(74) *Attorney, Agent, or Firm* — Bereskin & Parr LLP/S.E.N.C.R.L., s.r.l.

(57) ABSTRACT

Network security risk assessment systems and methods are provided. The system has a remote subscriber computer, a risk assessment viewer application, and a risk assessment server that receives a list of software applications operating within the subscriber organization network and a plurality of properties for each of the software applications, and receives a list of organizational nodes within the subscriber organization and a plurality of properties for each of the organizational nodes, determines one or more risk assessment scores and transmits a notification to the remote subscriber computer when a predefined reporting threshold is exceeded.

19 Claims, 11 Drawing Sheets

| Risk Type | Score | Value | Risk Criteria and Warnings |
|---|---|---|---|
| System Rule Warning | 10 | | Third party application and manufacturer support not indicated as "Yes" |
| Vendor Risk | -10 | Yes | Has this vendor signed our Privacy and Data Security legal agreement? |
| Human Resources R | 5 | Yes | Have key application personnel been redeployed? |
| Business & Operation | 10 | 2 | Recovery time objective (hours) |
| Data Risk | 15 | Yes | This application processes or stores personally identifiable information (PII) |
| Security & Availability | 10 | Yes | This application is accessed over the internet |

FIG. 9

METHODS AND SYSTEMS FOR ENHANCING DATA SECURITY IN A COMPUTER NETWORK

FIELD

The described embodiments relate to enhancing the security of computer systems in a networked environment and, in particular, to methods and systems for alerting to data security risks.

BACKGROUND

The nature of cybersecurity has changed fundamentally in the last five to ten years, presenting significant new problems to organizations that operate computer systems in a networked environment. The computer systems that contain an organization's most sensitive data—the "crown jewel" data—are increasingly connected to the wider world in a variety of new ways.

Few organizations have a clear picture of what their crown jewel data comprises, or all the places it may be stored. In general, crown jewel data is data that can significantly harm the organization if it has been viewed, stolen, changed, deleted or otherwise used without permission by an unauthorized individual.

Crown jewel data and its sensitivity will vary by organization, but examples include: customer payment card information, patient health information, banking information, personally identifiable information, trade secrets and other intellectual property, confidential financial information, regulatory or other material disclosures, payroll data, and executive e-mail.

Every organization may have other data that is less sensitive than crown jewel data. In many cases, crown jewel data may represent only a very small fraction of the total data managed and stored within the organization. Securing all data in the same manner as crown jewel data, while possible, can be wasteful and inefficient, both in terms of cost and also from a computing resource perspective. By identifying crown jewel data and possible risks of exposure, targeted protections can be implemented that make the most efficient use of available resources.

SUMMARY

In a first broad aspect, there is provided a method of determining and distributing a network security risk assessment for a subscriber organization network to a remote subscriber computer, the method comprising: providing a risk assessment viewer application to the remote subscriber computer; providing a risk assessment server to the subscriber organization network, the risk assessment server comprising a processor and a memory; receiving, at the risk assessment server: a list of software applications operating within the subscriber organization network; a plurality of properties for each of the software applications, wherein each property in the plurality of properties for each of the software applications is indicative of accessibility of predetermined critical data within the subscriber organization network; and a list of organizational nodes within the subscriber organization; and a plurality of properties for each of the organizational nodes, wherein each property in the plurality of properties for each of the organizational nodes is indicative of access to at least one of the list of software applications; storing the list of software applications, the plurality of properties for each of the software applications, the list of organizational nodes, and the plurality of properties for each of the organizational nodes in the memory; for each selected software application in the list of software applications, determining a software application risk assessment score for the selected software application based on the plurality of properties corresponding to the selected software application; for each selected organizational node in the list of organizational nodes, determining an organizational node risk assessment score for the selected organizational node based on the plurality of properties corresponding to the selected organizational node; determining a risk assessment score for the subscriber organization based on respective software application risk assessment scores of each of the list of software applications and respective organizational node risk assessment scores of each of the list of organizational nodes; transmitting a notification to the remote subscriber computer when a predefined reporting threshold is exceeded, wherein the predefined reporting threshold relates to one or more of the software application risk assessment scores, the organizational node risk assessment scores, and the risk assessment score for the subscriber organization, wherein the notification comprises a link that, when activated, activates the risk assessment viewer application to cause the notification to display on the remote subscriber computer and to enable connection via the link to the risk assessment server to obtain a risk assessment report about the subscriber organization.

In some cases, the list of organizational nodes comprises at least one of a service identifier, an organizational unit identifier and an employee identifier.

In some cases, one of the plurality of properties for each of the list of software applications is indicative of Internet-accessibility. In some cases, one of the plurality of properties for each of the list of software applications is indicative of third-party origin. In some cases, one of the plurality of properties for each of the list of software applications is indicative of data encryption.

In some cases, each property of each of the list of software applications comprises a numeric score value.

In some cases, the risk assessment score is determined by, for each respective property of the software application: retrieving the numeric score value of the respective property; and applying a weight factor to the numeric score value of the respective property to obtain a weighted score for the respective property; and adjusting the risk assessment score based on the weighted score of each respective property.

In some cases, the organizational node risk assessment score for each respective organizational node is adjusted based on the software application risk assessment score of each software application to which the respective organizational node is connected.

In some cases, generating a risk model for the subscriber organization further comprises the risk model specifying interconnection weights between each of the list of software applications and each of the list of organizational nodes.

In some cases, the risk assessment report comprises a visual representation of the risk model.

In another broad aspect, there is provided a method of determining and distributing a network security risk assessment for a subscriber organization network to a remote subscriber computer, the method comprising: providing a risk assessment server to the subscriber organization network, the risk assessment server comprising a processor and a memory; receiving, at the risk assessment server, a list of organizational nodes within the subscriber organization, and a plurality of properties for each of the organizational nodes;

storing the list of organizational nodes, and the plurality of properties for each of the organizational nodes in the memory; and determining a risk assessment score for the subscriber organization.

In still another broad aspect, there is provided a network security risk assessment system, the system comprising: a remote subscriber computer; a risk assessment viewer application stored in a memory of the remote subscriber computer; a risk assessment server within a subscriber organization network connected to the remote subscriber computer, the risk assessment server comprising: a memory, at least one network interface; and a processor coupled to the memory for electronic communication therewith, the processor configured to: receive a list of software applications operating within the subscriber organization network; receive a plurality of properties for each of the software applications, wherein each property in the plurality of properties for each of the software applications is indicative of accessibility of predetermined critical data within the subscriber organization network; and receive a list of organizational nodes within the subscriber organization; and receive a plurality of properties for each of the organizational nodes, wherein each property in the plurality of properties for each of the organizational nodes is indicative of access to at least one of the list of software applications; store the list of software applications, the plurality of properties for each of the software applications, the list of organizational nodes, and the plurality of properties for each of the organizational nodes in the memory; for each selected software application in the list of software applications, determine a software application risk assessment score for the selected software application based on the plurality of properties corresponding to the selected software application; for each selected organizational node in the list of organizational nodes, determine an organizational node risk assessment score for the selected organizational node based on the plurality of properties corresponding to the selected organizational node; determine a risk assessment score for the subscriber organization based on respective software application risk assessment scores of each of the list of software applications and respective organizational node risk assessment scores of each of the list of organizational nodes; transmit a notification to the remote subscriber computer when a predefined reporting threshold is exceeded, wherein the predefined reporting threshold relates to one or more of the software application risk assessment scores, the organizational node risk assessment scores, and the risk assessment score for the subscriber organization, wherein the notification comprises a link that, when activated, activates the risk assessment viewer application to cause the notification to display on the remote subscriber computer and to enable connection via the link to the risk assessment server to obtain a risk assessment report about the subscriber organization.

In some cases, the list of organizational nodes comprises at least one of a service identifier, an organizational unit identifier and an employee identifier.

In some cases, one of the plurality of properties for each of the list of software applications is indicative of Internet-accessibility. In some cases, one of the plurality of properties for each of the list of software applications is indicative of third-party origin. In some cases, one of the plurality of properties for each of the list of software applications is indicative of data encryption.

In some cases, each property of each of the list of software applications comprises a numeric score value.

In some cases, the risk assessment score is determined by, for each respective property of the software application: retrieving the numeric score value of the respective property; and applying a weight factor to the numeric score value of the respective property to obtain a weighted score for the respective property; and adjusting the risk assessment score based on the weighted score of each respective property.

In some cases, the organizational node risk assessment score for each respective organizational node is adjusted based on the software application risk assessment score of each software application to which the respective organizational node is connected.

In some cases, the microprocessor generates a risk model for the subscriber organization, the risk model specifying interconnection weights between each of the list of software applications and each of the list of organizational nodes.

BRIEF DESCRIPTION OF THE DRAWINGS

A preferred embodiment of the present invention will now be described in detail with reference to the drawings, in which:

FIG. 7 illustrates an example application and data risk scoring display in accordance with an example embodiment;

FIG. 8 illustrates an example application and data risk attribute list display in accordance with an example embodiment;

FIG. 9 illustrates an example application risk score display in accordance with an example embodiment;

Figure 1:
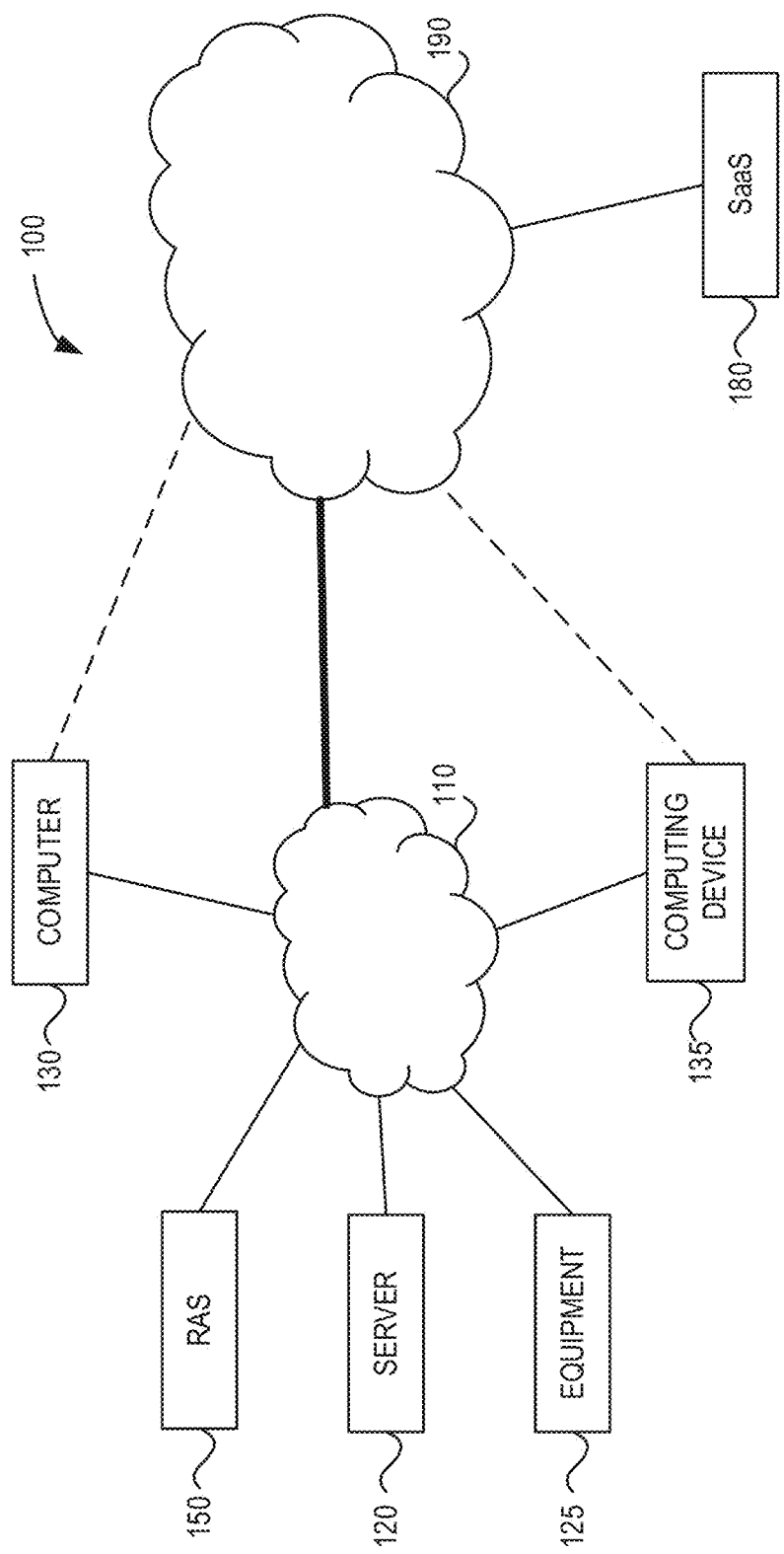
FIG. 1 is a block diagram of an organizational computer network system in accordance with an example embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXEMPLARY EMBODIMENTS

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Furthermore, any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a pushbutton keyboard, mouse, a touchscreen, and the like), and at least one output device (e.g. a display screen, a printer, a wireless radio, and the like) depending on the nature of the device.

It should also be noted that there may be some elements that are used to implement at least part of one of the embodiments described herein that may be implemented via software that is written in a high-level computer programming language such as object oriented programming. Accordingly, the program code may be written in C, C++ or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

Current cybersecurity practices depend on detailed analysis and deployment of technology at the computer network level, to try and prevent unwanted intrusions. This broad approach has led to inefficient and ineffective practices. The described embodiments provide for a data-centric view of risk, that centers efforts on securing the most important data however it may be secured.

In order to adequately secure crown jewel data, it is necessary to identify what the crown jewel data is, where it is, what applications can access it, what interfaces there are to those applications, and which people can use them.

For instance, applications and their data can be used over fixed and mobile networks by employees, customers, suppliers, regulators, financiers, transaction processors, vendors and other stakeholders on all sorts of devices from unintelligent terminals to smart phones. There are many examples of the different ways organizational data can be exposed to risk, for example: customers using web sites to access services directly on home computers and phones, electronic ordering and billing from suppliers, employees working remotely, software-as-a-service (SaaS) applications with crown jewel data located on third party servers, equipment suppliers monitoring their product for maintenance reasons, facilities equipment connected directly to core networks and systems, wireless networks that may be available to visitors, bring your own device (BYOD) policies, etc.

The notion of protecting systems and data behind an organizational "firewall" is still necessary, but ineffective against sophisticated targeted attacks. Even intrusion detection systems can be circumvented, and there is no foolproof way to monitor these applications. Traffic exploiting a highly specific, previously unknown application vulnerability can be very difficult to spot, and thus difficult to block.

The nature of the attacker targeting the organization also has changed fundamentally in the last ten years. Attackers often may have greater skill and resources than an organization's own security administrators.

Data, once stolen, can be sold, and this has attracted sophisticated organized crime rings. In parallel, the incidence of cyber-warfare and other attacks from nation states has grown exponentially. Most organizations have not responded to these and other changes in cybersecurity, and are falling behind the malicious actors or intruders. This is evidenced by the increasing rate of hacks and data breaches. Threats now range from mass denial-of-service attacks and broad known-vulnerability attacks to very specific attacks that target a narrow vulnerability. Potential intruders now have the time, scale and tools to study and find vulnerabilities in software applications in a targeted organization. Increasingly attacks have included personal phishing, mimicry, device tampering or heft attacks against specific individuals in an organization.

There are many reasons why organizations are struggling to meet these changes.

For instance, most computer systems are vulnerable and were never designed for the kind of openness they now experience. Software applications have always been considered the "soft underbelly" of information security, and often contain a variety coding vulnerabilities and weaknesses, particularly where interfaces with other systems and technologies occur.

Compounding this problem is the fact that these systems are usually poorly understood. In particular, documentation may be lacking to understand where key data is stored and accessed, where the weak links between systems may be open to failure or misuse, and where the applications themselves sit on underlying risky technology. The information that does exist is typically stored in spreadsheets and static diagrams, such that it is typically out of date and untrusted. Most of the information regarding risks to applications and crown jewel data assets instead resides only in the "tribal knowledge", i.e., in the minds of technology subject matter experts. Changes in staffing can result in the organization's loss of this knowledge, sometimes abruptly.

The current state of the art in information technology (IT) risk management typically employs spreadsheet-based surveys completed at discrete intervals (usually annually) or relies on software tools and processes that are overly complex and expensive, requiring large amounts of data and making several layers of subjective assumptions.

In addition, organizational decision makers often do not receive the context that they require to make effective risk management decisions. Cybersecurity risk is not described to them in terms they can understand and they do not receive comparative benchmarking data on how their organization's preparedness and risk compare to their peers and competitors in the industry.

Every organization lives in a different security environment. Some external factors affecting this include: the quantity and external value of crown jewel data; industry, professional, local and national regulation; global industry competitive environment; strategic importance; value of reputational loss from potential breaches; potential lawsuit legal and settlement costs. There also may be a number of internal factors, such as employee morale, vulnerability of hardware, vulnerability of application design, etc.

The various combinations of these factors may vary widely even between very similar organizations. The result is that there are no "standard" risk models, and no cookie-cutter solutions to quantifying risk. Automating a risk analysis tool is more difficult still, which has resulted in a lack of adequate tools to date.

Many organizations may have some form of Business Continuity, Service Interruption or Disaster Recovery plans, as mitigation for the risk of potential large-scale technical failures, facility outages, or widespread quarantine situations. These are important, and do serve to document at a high level many important applications and critical technical infrastructure. But they do not serve to quantify or identify mitigating actions to cyber-security risks, other than a small class of large-scale denial-of-service attacks.

In addition to technical risks, organizations may need to consider their organizational risks as a result of breaches, but also as a consequence of mitigating technical risks. Breaches result in real harm to organizational activities. What is rarely clear in advance is which organizational services are at most risk. Mitigation of risk imposes costs, and therefore it is important to understand which activities are at most risk. There is little point in fully protecting a small service while leaving a large service exposed, even though this may be the least expensive or most elegant technical direction.

Measurement of risk can be facilitated by understanding the applications that support specific organizational functions. This can be performed through the use of a model of the services and functions of the entire organization, a model of crown jewel data, and a model of the applications that access and manipulate that data. Additionally, there may be an overall model relating the underlying aspects in a useful way, coupled with an engine to measure and determine risks.

Conventionally, the development of a custom risk model for an organization has required specialized skills possessed only by relatively few professionals. An organization's own IT staff may lack these skills and specialized training. Internal staff may be able to quantify internal technical risks, but no more.

The described embodiments are generally directed to measuring and monitoring an organization's cybersecurity risk through modeling, displaying, and maintaining relationships among "crown jewel" data, software applications and organizational nodes operating within the organization. This data-centric view of risk allows for organizations to better allocate security resources and increase their confidence of minimized risk from cybersecurity threats. It allows organizations to reduce efforts on protecting non crown-jewel data, and use those efforts to better protect the critical crown jewel data.

Referring now to FIG. 1, there is provided is a block diagram of an organizational computer network system in accordance with an example embodiment.

Computer network system 100 generally comprises a plurality of computers connected via data communication network 110, which itself may be connected to the Internet 190. Typically, the connection between network 110 and Internet 190 may be made via a firewall server (not shown). In some cases, there may be multiple links or firewalls, or both, between network 110 and Internet 190. Some organizations may operate multiple networks 110 or virtual networks 110, which can be internetworked or isolated. These have been omitted for ease of illustration, however it will be understood that the teachings herein can be applied to such systems.

Network 110 may be constructed from one or more computer network technologies, such as IEEE 802.3 (Ethernet), IEEE 802.11 and similar technologies.

Computers and computing devices may be connected to network 110 or a portion thereof via suitable network interfaces. Computing devices may also encompass any connected or "smart" devices capable of data communication, such as thermostats, air quality sensors, industrial equipment and the like. Increasingly, this encompasses a wide variety of devices as more devices become networked through the "Internet of Things".

Examples of computers include a portable laptop computer 130, which can connect to network 110 via a wired Ethernet connection, but which may also connect independently to Internet 190 via a wireless connection. Portable laptop computer 130 has a processor, volatile memory and non-volatile storage memory, at least one network interface, input devices such as a keyboard and trackpad, output devices such as a display and speakers, and various other input/output devices as will be appreciated.

Similarly, personal computing device 135 is a smartphone or tablet computer. Like computer 130, computing device 135 has a processor, volatile and non-volatile memory, at least one network interface, and input/output devices. Computing device 135 is portable, and may at times be connected to network 110 or a portion thereof. Computing device 135 may at times be connected independently to Internet 190.

Networked equipment 125 is an example computing device that may be an industrial machine, facilities equipment, sensor, or any other machine that is connected to network 110. Networked equipment 125 has a processor, such as a microcontroller, a memory that may include volatile and non-volatile elements, and at least one network interface. Optionally, networked equipment 125 may include additional input or output devices, although this is not required for some types of equipment.

Server 120 is a computer server that is connected to network 110. Like computer 130, server 120 has a processor, volatile and non-volatile memory, at least one network interface, and may have various other input/output devices.

As with all devices shown in computer network system 100, there may be multiple servers 120, although not all are shown. Some of the servers 120 may store or otherwise have access to crown jewel data.

Crown jewel data refers to data that can significantly harm the organization if it has been viewed, stolen, changed, deleted or otherwise used without permission by an unauthorized individual. Crown jewel data may be initially identified in a manual process, for example, by organizational managers.

Each of the computers and computing devices may at times connect to external computers or servers via Internet 190. For example, server 120 may be an e-mail server that connects to a third-party e-mail server, or networked equipment 125 may connect to a software update server to obtain the latest version of a software application or firmware.

Software-as-a-service server (SaaS server) 180 is one or more computer server that is connected to network 110. Like server 120, SaaS server 180 has a processor, volatile and non-volatile memory, at least one network interface, and may have various other input/output devices. In many cases, SaaS server 180 may be constructed from a server farm, which may be in geographically diverse locations, and accessed via a load balancer. Such arrangements are sometimes referred to as "cloud" services. In general, SaaS server 180 provides one or more software application to the organization, and may be accessed by one or more device from within network 110 and occasionally from outside of network 110.

Risk assessment server 150 is a computer or computer server, and has a processor, volatile and non-volatile memory, at least one network interface, and may have various other input/output devices. As shown, risk assessment server 150 is linked to network 110. However, in other embodiments, risk assessment server 150 may be outside network 110 and linked to Internet 190. Risk assessment server 150 is described in greater detail with reference to FIG. 2 herein.

As used herein, the term "software application" or "application" refers to computer-executable instructions, particularly computer-executable instructions stored in a non-transitory medium, such as a non-volatile memory, and executed by a computer processor. The computer processor, when executing the instructions, may receive inputs and transmit outputs to any of a variety of input or output devices to which it is coupled. Within an organization, a software application may be recognized by a name by both the people who use it, and those that supply or maintain it. A software application can be, for example, a monolithic software application, built in-house by the organization and possibly running on custom hardware; a set of interconnected modular subsystems running on similar or diverse hardware; a software-as-a-service application operated remotely by a third party; third party software running on outsourced infrastructure, etc. In some cases, a software application also may be less formal, or constructed in ad hoc fashion, such as a programmable spreadsheet document that has been modified to perform computations for the organization's needs. For example, for many organizations, important applications and services rely on regular input from spreadsheets that may be obtained from third parties, so these spreadsheets may be identified as software applications.

Figure 2:
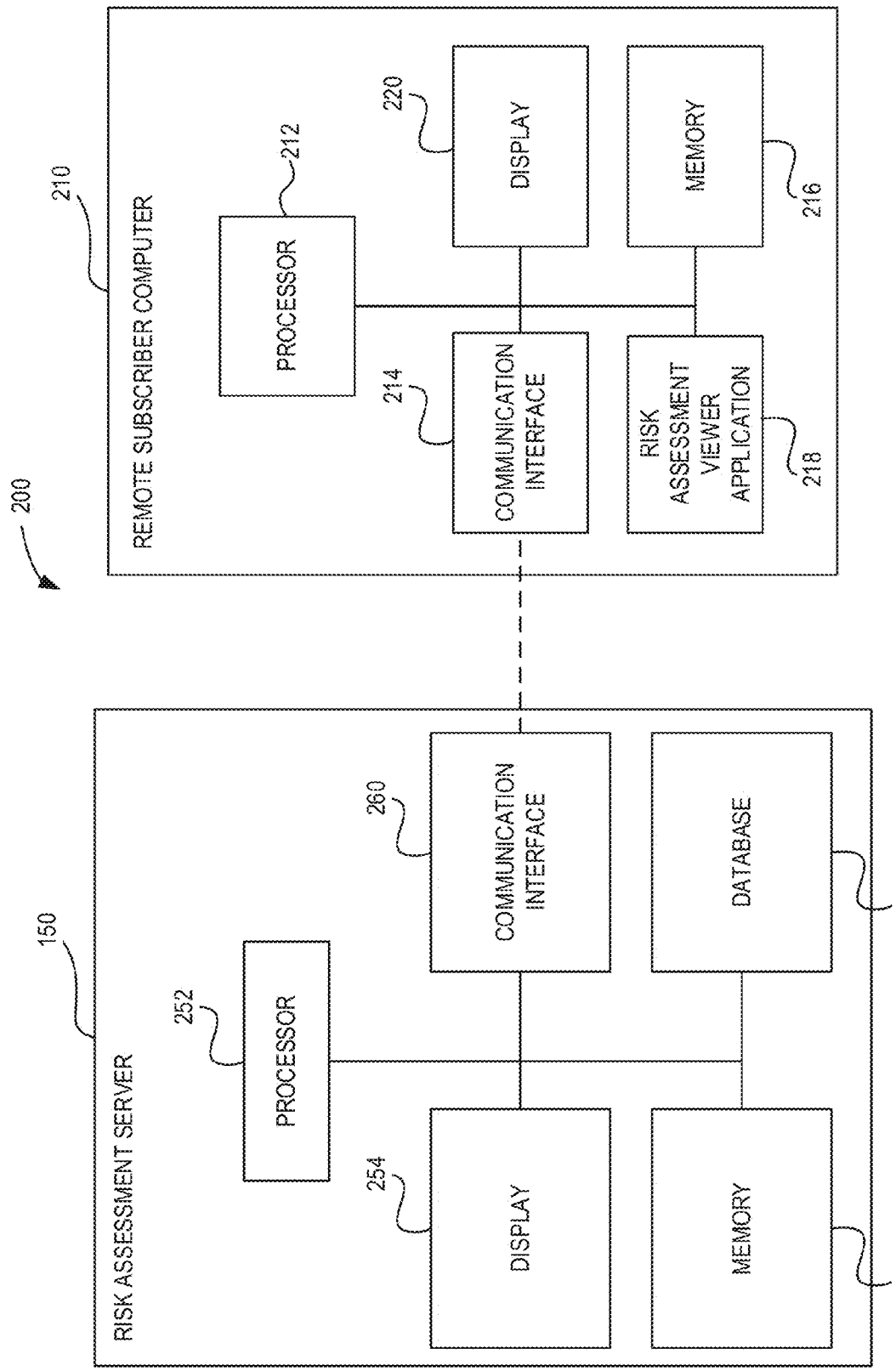
FIG. 2 is a block diagram of a network security risk assessment system in accordance with an example embodiment.

Referring now to FIG. 2, there is shown a block diagram of a risk assessment system 200 in accordance with an example embodiment. Risk assessment system 200 is constructed from risk assessment server (RAS) 150 and a remote subscriber computer 210. RAS 150 may be directly linked to remote subscriber computer 210, for example, via a Universal Serial Bus, Bluetooth™ or Ethernet connection. Alternatively, RAS 150 may be linked to remote subscriber computer 210 via network 110 or, in some cases, Internet 190 of computer network system 100.

RAS 150 has a processor 252, a display 254, a memory 256, a communication interface 260 and a database 258. Although shown as separate elements, it will be understood that database 258 may be stored in memory 256.

Processor 252 is a computer processor, such as a general purpose microprocessor. In some other cases, processor 252 may be a field programmable gate array, application specific integrated circuit, microcontroller, or other suitable computer processor.

Processor 252 is coupled, via a computer data bus, to memory 256, Memory 256 may include both volatile and non-volatile memory. Non-volatile memory stores computer programs consisting of computer-executable instructions, which may be loaded into volatile memory for execution by processor 252 as needed. It will be understood by those of skill in the art that references herein to RAS 150 as carrying out a function or acting in a particular way imply that processor 252 is executing instructions (e.g., a software program) stored in memory 256 and possibly transmitting or receiving inputs and outputs via one or more interface. Memory 256 may also store data input to, or output from, processor 252 in the course of executing the computer-executable instructions. As noted above, memory 256 may also store database 258.

In some example embodiments, database 258 is a relational database. In other embodiments, database 258 may be a non-relational database, such as a key-value database, NoSQL database, or the like.

Processor 252 is also coupled to display 254, which is a suitable display for outputting information and data as needed by various computer programs. In particular, display 254 may display a graphical user interface (GUI).

Communication interface 260 is one or more data network interface, such as an IEEE 802.3 or IEEE 802.11 interface, for communication over a network.

RAS 150 may execute an operating system, such as Microsoft Windows™, GNU/Linux, or other suitable operating system.

Remote subscriber computer 210 is generally a computer and therefore has a processor 212, a communication interface 214 for data communication with communication interface 260, a display 220 for displaying a corresponding remote subscriber computer GUI, and a memory 216 that may include both volatile and non-volatile elements. As with RAS 150, references to acts or functions remote subscriber computer 210 imply that processor 212 is executing computer-executable instructions (e.g., a software program) stored in memory 216.

The remote subscriber computer GUI enables an authorized user of remote subscriber computer 210 to interface with and operate RAS 150, for example to input data regarding software applications and to receive output from RAS 150, e.g., using a risk assessment viewer application. For example, remote subscriber computer GUI may use the Google Android™ operating system, and the risk assessment viewer application may be a mobile application software program capable of execution in the Android™ environment.

Both RAS 150 and remote subscriber computer 210 may have additional input or output devices (e.g., keyboard, pointing device, etc.) that are not shown.

Generally, RAS 150 can predict risk levels and a measure of cybersecurity preparedness based on small amounts of input data characteristic of computer network system 100. For example, RAS 150 can use the properties of an organization's software applications to generate an overall risk score. Moreover, RAS 150 can use a mapping of the software applications to predict the impact of a breach of any software application to the organization's services. This approach is in contrast to traditional risk management systems that require vast amounts of data and complex impact models. Furthermore, RAS 150 may perform benchmarking by comparing risk and preparedness scores of one organization to the anonymized risk and preparedness scores of other organizations. Comparisons may be normalized for organization size, industry and threat model.

Furthermore, RAS 150 may perform benchmarking by comparing risk and preparedness scores of one organization to the anonymized risk and preparedness scores of other organizations. Comparisons may be normalized for organization size, industry and threat model.

Comparative risk scoring can utilize three basic sources of data. The first can be a global database of known cybersecurity failures, as derived from a variety of published and verified reports. The second can be a database mined from the data of systems such as those described herein to determine aggregate risk scores by various classifications. The third can be the risk scores for an individual organization.

The global database can categorize each incident as to the industry in which it occurred, the size of the organization involved, and the consequences of the breach. The database can also contain information regarding the total number of organizations in that industry and the number of organizations by size. This data can be analyzed to determine an overall threat and risk profile for an industry and for organizations of certain sizes.

The mined database can contain statistics on a client organization's models, including, but not restricted to, numbers of processes, applications, interfaces, crown jewel data, risk questions, assessment dates, and other data as contained in the invention. These statistics will be calculated to include such comparative measurements as breadth of model (by counting numbers of model components), complexity of model (by counting relationships between model components), and currency of model (by measuring average assessment intervals, and absolute durations since last assessments).

The individual organization statistics can then be compared against those statistics from organizations in the same industry, and against those statistics from similar size organizations. For example, if the measured organization has a greater breadth of model compared with others in its industry, this may result in a higher score. If the organization has longer times since last assessments than the average for the size of the organization, it may receive a lower score. This scoring can occur for each category or comparative measurement, which can then be summed or otherwise combined to give a total score. This score can then be adjusted lower for higher risk industries, or higher for lower risk industries based on the statistics from the global database.

These scores can be presented by industry, and by organizations of similar size, giving information to the organization about how well it is doing with cybersecurity relative to its peers.

The risk scores or cybersecurity preparedness levels for individual software applications, groups of software applications, organizational nodes, or any combination thereof, may serve as a proxy for the overall risk and preparedness of the overall organization. Scores may be kept current through changes and additions. Alerts or notifications may be sent to interested users when risk levels change or when predetermined thresholds are exceeded, or both.

A "organizational node" refers to any construct that is capable of interfacing or interacting with another part of the organization. For example, an organizational node may refer to a service that an organization provides, whether internally or externally. An organizational node may also be an organizational unit within the organization, or an employee (often a key employee that has access to crown jewel data). In some cases, an organizational node may be any entity defined in the system by an authorized user of RAS 150.

Organizational nodes may also refer to internal interfaces and external interfaces. Internal interfaces are points where data may be interchanged between software applications and organizational nodes, or between organizational nodes. External interfaces fall into two general categories: 1) direct data interchange with an external entity, which represents a higher risk; and 2) data interchange with external human parties through web browsers, mobile apps, and so forth, which also carry a higher risk.

Figure 3:
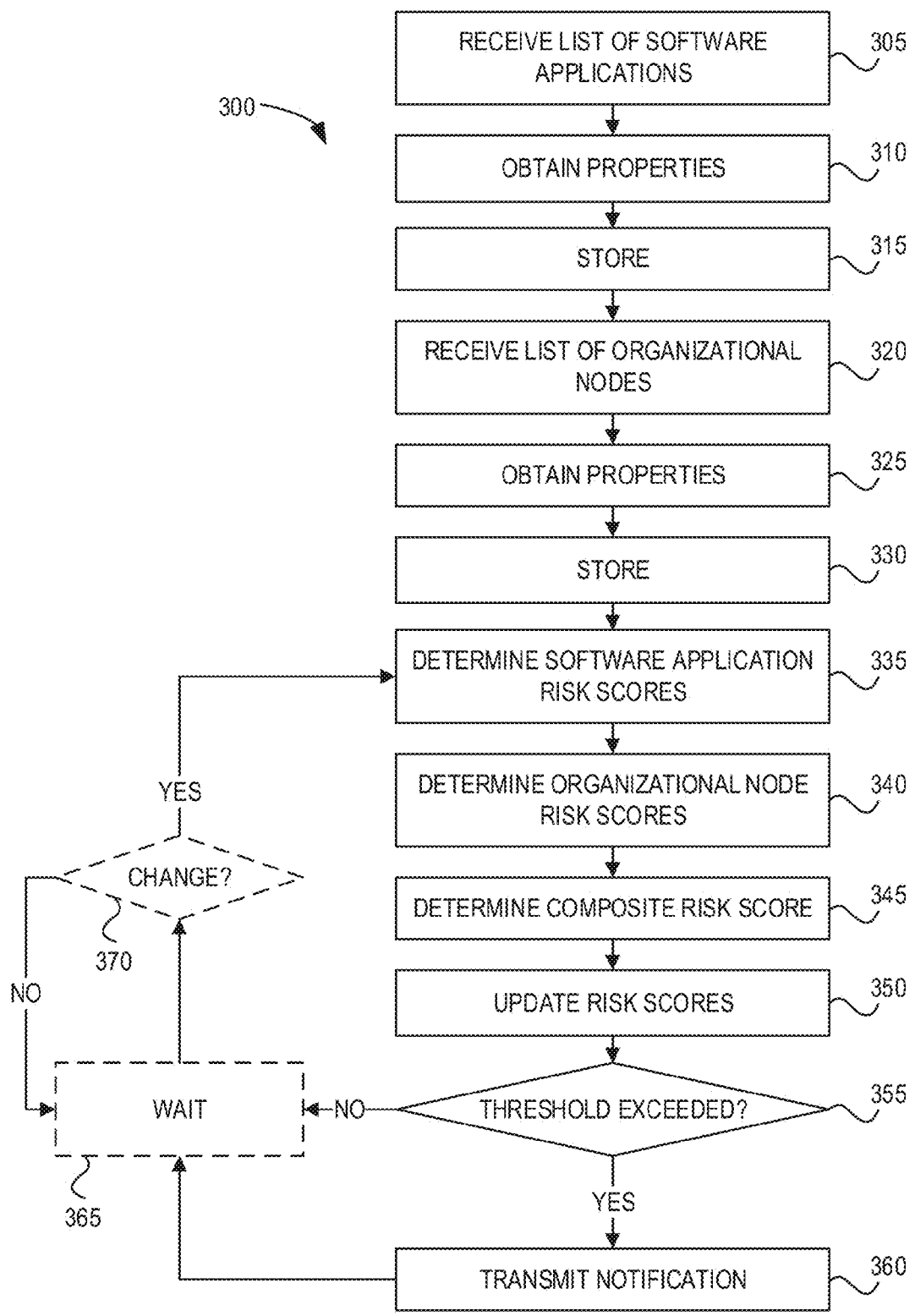
FIG. 3 is a flowchart illustrating a method of determining and distributing a network security risk assessment for an organization in accordance with an example embodiment.

Referring now to FIG. 3, there is shown a flowchart illustrating a method or process of determining a network security risk assessment for a subscriber organization and delivering the assessment to a remote subscriber computer. Method 300 may be carried out by RAS 150, for example, in accordance with the example embodiments.

The goal of cybersecurity risk modelling is to satisfy two major goals: 1) ensure the most valuable crown jewel data is appropriately protected; and 2) to provide a reliable, provable process for organizational decision makers to oversee cybersecurity and, if necessary, take appropriate actions to increase or reallocate human and technical resources to reduce the risks of crown jewel data exposure.

Conventionally, getting to a state where the details of every service, software application, organizational node and related data are known, and modeled for risk can be a daunting and error-prone undertaking. Such an approach has required significant resources, both in terms of data storage and in human resources to manage the data. Moreover, because of the large volumes of data, the result is error-prone, and can lead to misleading results when data is missing or simply falsified. It is relatively easy to collect vast amounts of data. Conventionally, it has been much more difficult to organize that data into coherent models. Conventional approaches make it easy to lose focus and become enmeshed in details, or to build models so complicated their output is not useful, if not actually suspect.

The described embodiments provide an operationalized approach that automatically yields and keeps current as much of the risk model as desired, with provable oversight. At the same time, the described embodiments provide a much more efficient approach, in which non-critical data and elements are identified as such, allowing limited resources to be focused on protecting crown jewel data.

Moreover, continued operation of the described embodiments allows for views of risk to mature, as the criteria and scorings evolve. Smaller models allow for faster evolution.

To facilitate the development of a risk model for an organization, first the crown jewel data must be identified. Typically, decision makers within the organization will have a fairly complete idea of what the crown jewel data is, and documentation thereof can be completed in various ways, such as electronic questionnaires, interviews, etc. Initially, the list of crown jewel data may be large. A draft list can be produced and circulated among a sample of decision makers to ensure completeness, to ensure that terminology and definitions are consistent and understood, and to develop a consensus on importance, which will set the modelling priority.

At the conclusion of this initial information gathering, one or two pieces of crown jewel data can be selected for prototype models.

Referring now to FIG. 3, method 300 begins at 305 with the collection of a list of software applications in use within a subscriber organization's network, in order to develop a prototype model and, in particular, to identify software applications that use crown jewel data. Preferably, the software application model is no more than two levels deep, as finer granularity can reduce clarity and magnify errors.

The list of software applications may be manually gathered and input via the remote subscriber computer 210 for transmission to the RAS 150. Alternatively, the list of software applications may be input directly to RAS 150. In some cases, the list of software applications may be automatically gathered using a network scanning tool, software license management tool, or other suitable input. However, a production environment scan may yield thousands (or even hundreds of thousands) of running processes, but will not necessary reveal information as to what software applications these are part of, if any, or how they access crown jewel data. Preferably, software applications that access crown jewel data are identified in a manual process, as this greatly reduces the complexity and size of the risk model, as well as the evaluation time.

RAS 150 may use the list of software applications initially to generate a prototype risk model for the organization. In some cases, the list may be a follow-up list of applications, which RAS 150 may add to an existing risk model, or use to re-generate a risk model.

At 310, the RAS 150 or the remote subscriber computer 210 may iterate through each software application in the list of software applications. For each software application, RAS 150 receives an indication of one or more properties associated with the software application. Properties may be defined according to organizational need. However, in some embodiments, properties may be indicative of the accessibility of predetermined critical data (e.g., crown jewel data) within the subscriber organization network.

Examples of properties of software applications include indications of the accessibility of the software application to and from the Internet, indications of whether the software application was developed by a third-party, and indications of whether data accessible by the software application is encrypted. Still other properties may be indicative of the age of the software application or its current version, a regulatory compliance status, an audit status, an indication of the number of employees who can access the software application or their trust level, a risk mitigation cost (which can be charged back to others), and so forth. It will be appreciated that still other properties can be defined. However, in general, a small subset of properties—e.g., between 7 and 10—is preferred so as not to introduce unnecessary complexity.

In some cases, the properties contain indications in the form of a numeric score value, or a range of values. For example, a property that indicates a serious risk of unauthorized access, e.g., because data is not encrypted, may have a higher numeric score. In contrast, a property that indicates that a software application encrypts all data may have a lower numeric score.

Once the list of software applications and their respective properties have been gathered, they may be saved at 315. In some cases, the list of software applications and respective properties may be updated on an as-available basis, such that the list is built up over time.

At 320, RAS 150 collects a list of organizational nodes within a subscriber organization's network. As with software applications, the organizational node model preferably is no more than two levels deep, as finer granularity can reduce clarity and magnify errors.

The list of organizational nodes may be manually gathered and input via the remote subscriber computer 210 for transmission to the RAS 150. Alternatively, the list of organizational nodes may be input directly to RAS 150.

As with software applications, the list of organizational nodes can be an initial list of organizational nodes to be included in an initial risk model, or an update to an existing list of organizational nodes to add to an existing risk model.

At 325, the RAS 150 or the remote subscriber computer 210 may iterate through each organizational node in the list of organizational nodes. For each organizational node, RAS 150 receives an indication of one or more properties associated with the organizational node. Properties may be defined according to organizational need. However, in some embodiments, properties may be indicative of the organizational nodes access to one or more software applications. In particular, one such property may contain links to the software applications.

As with software application properties, the organizational node properties can contain indications in the form of a numeric score value, or a range of values. For example, a property that indicates that an organizational node requires access to crown jewel data may have a high score.

Once the list of organizational nodes and their respective properties have been gathered, they may be saved at 330. In some cases, the list of organizational nodes and respective properties may be updated on an as-available basis, such that the list is built up over time.

Optionally, the list of software applications, the list of organizational nodes, or any of their respective properties can be inspected manually at any time using RAS 150 or remote subscriber computer 210. To facilitate manual inspection, RAS 150 or remote subscriber computer 210 may present visualizations of the entered data and employ highlighting to ease comprehension. For example, software applications with a favorable risk assessment score may be highlighted in green, while those with unfavorable risk assessment scores may be highlighted in red. Similarly, individual properties may be highlighted in similar fashion. Various techniques can be used to assist in comprehension by a user.

Depending on the outcome of the inspection, users may choose to alter one or more properties.

As noted above, some properties may relate to risk attributes for each software application or organizational node. Such risk attributes can be grouped into a set of risk categories, for example, regulatory data, audit, data, external access, etc.

In some cases, properties, or risk attributes, of a software application may be obtained by prompting, via remote subscriber computer 210, a user to answer a set of questions about each software application. Each risk attribute may correspond to one question, and the user may provide input to select or set the property to a particular numeric score value. In some cases, the user may provide text-based input, which may be interpreted by remote subscriber computer 210 or RAS 150 to generate a numeric score value, depending on the obtained answer to the question. If a question is not answered, the risk score for the corresponding risk attribute can be set to a default numeric score value.

In some cases, RAS 150 may be preconfigured with a predetermined list of questions, and answers with appropriate numeric score values. In some cases, each subscriber organization can specify its own questions, answers and the corresponding numeric score values.

These numeric score values for each property of a software application may be used as-is to adjust a software application risk assessment score. In some cases, the numeric score values may be weighted according to predefined weights prior to adjusting the software application risk assessment score.

For example, for the question "Does this application use sensitive employee data?". Possible answers may be "yes", "no", or "unknown". Score values may be allocated for each possible answer, for example, 20 for "yes", 0 for "no", and 20 for "unknown". Alternatively, "yes" may be the default answer. Scores may be negative to account for risk mitigation. For example, a "yes" answer to the question "Is this sensitive employee data encrypted?" may be assigned a score of "−10", indicating reduced risk. In another example, a question such as "Is this application accessible over the Internet?" may have an assigned score of 50 for a "yes" answer, to weigh this risk as being higher than the risk of having access to sensitive employee data. Individual risks may vary with an organization's industry, its culture, and the nature of threats it faces.

At 335, the RAS 150 may iterate through the list of software applications, and determine a software application risk assessment score for each selected software application based on the properties corresponding to the selected software application. The risk assessment score for each software application may be determined by adding the scores from its properties or risk attributes. In some embodiments, an attribute may be ignored or marked as not applicable for an application, and as such will not be taken into account when calculating the risk assessment score of that application.

Figure 6:
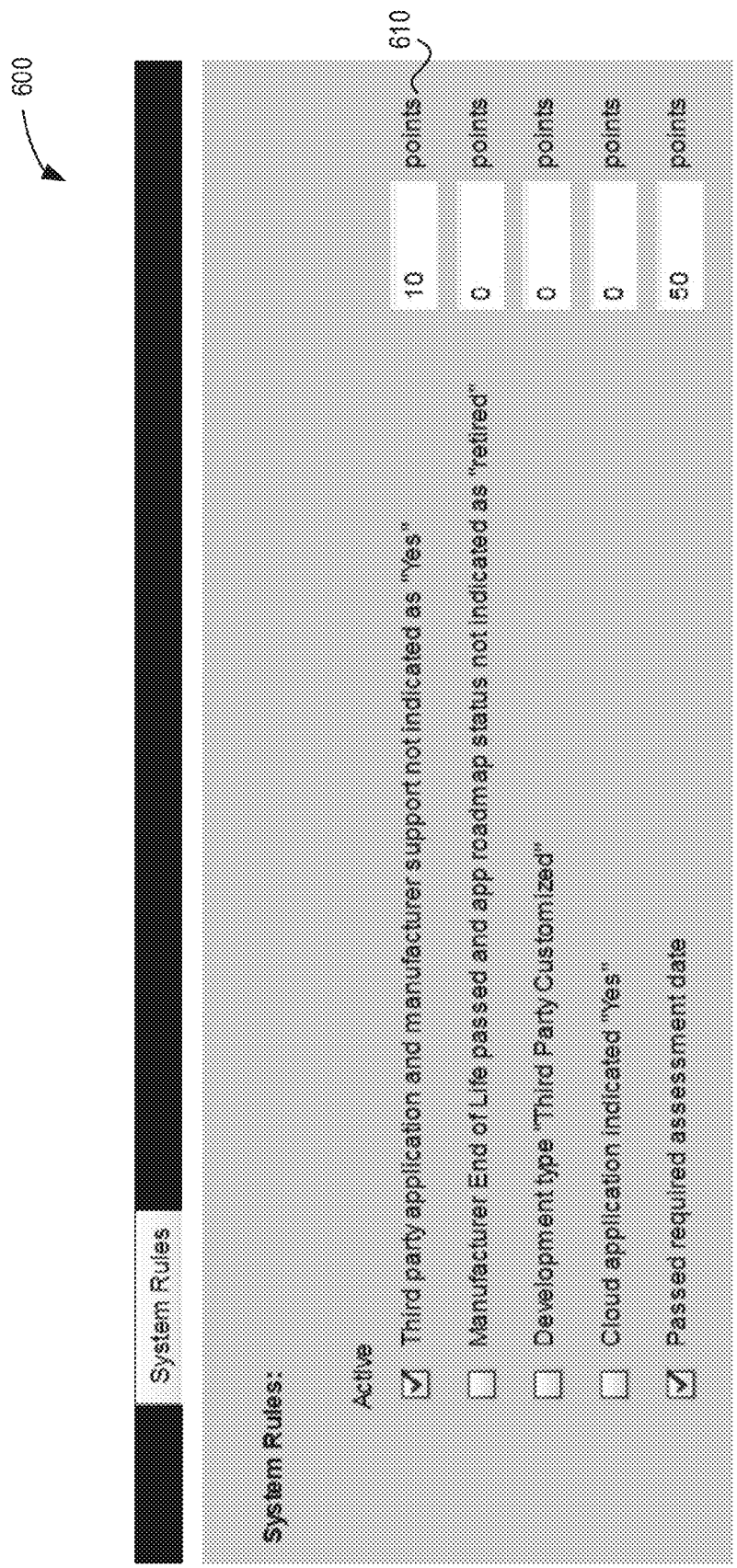
FIG. 6 illustrates an example systemic risk factor display in accordance with an example embodiment.

Referring briefly to FIG. 6, there is illustrated an example systemic risk factor display, such as may be generated in a dashboard view of RAS 150 or risk assessment viewer application 218.

Risk factor display 600 demonstrates the configuration of a possible sample of System Rules. These rules generally are not assigned to any specific application but can be calculated for each software application or organizational node based on its qualities, attributes or properties. For example, rule 610 specifies that if a software application has been labelled as originating with a Third-Party, and, in another attribute, has been marked as not supported by the manufacturer, it should have its risk score increased by 10 points. Many other rules are possible. Some of these System Rules may be prespecified, but others can can be created or modified by an organization as needed, as can the risk point values associated with each rule. Individual rules can also be marked active, for example by selecting a corresponding checkbox. Alternatively, rules can be marked as inactive, for example by deselecting a corresponding checkbox, in which case they may be disabled for an organization.

Figure 7:
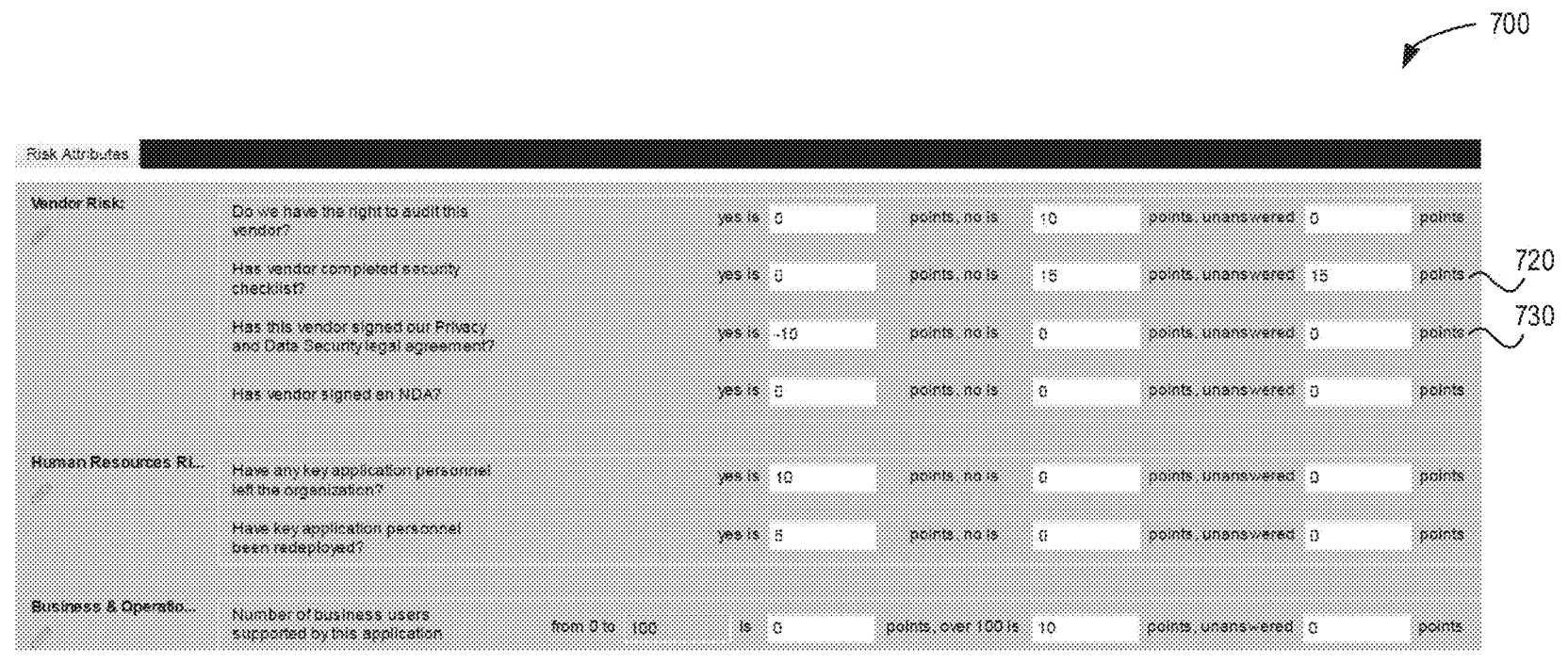

Referring briefly to FIG. 7, there is illustrated an example risk attribute display, such as may be generated in a dashboard view of RAS 150 or risk assessment viewer application 218.

Risk attribute display 700 generally provides for the configuration of inquiries that can be addressed (e.g., by a user) for each software application or organizational node. Each attribute may describe a query about a software application or organizational node that may affect its risk score. For example, attribute 720 states that if the query regarding vendor security checklists has been answered for a specific application with a "yes", that no risk points should be added for that application. Similarly, if answered "no", a risk has been exposed, and 15 points should be added to the overall risk score for that application. In this specific case, if the question has not been answered, the same 15 points will be added, demonstrating that the lack of an answer in this case is assumed to be the worst case. These are merely examples; the actual queries may be determined by, and may vary from organization to organization. In another example attribute 730 states that if the query regarding a vendor Privacy and Data Security Agreement has been answered for a specific software application with a "yes", that 10 risk points will be deducted for that application, as a mitigation against data risk. Similarly, if answered "no", no new risk has been exposed, so no additional points will be added to the overall risk score for that application. Again, this is but one example; the actual individual queries can be determined by, and will vary from organization to organization.

Figure 8:
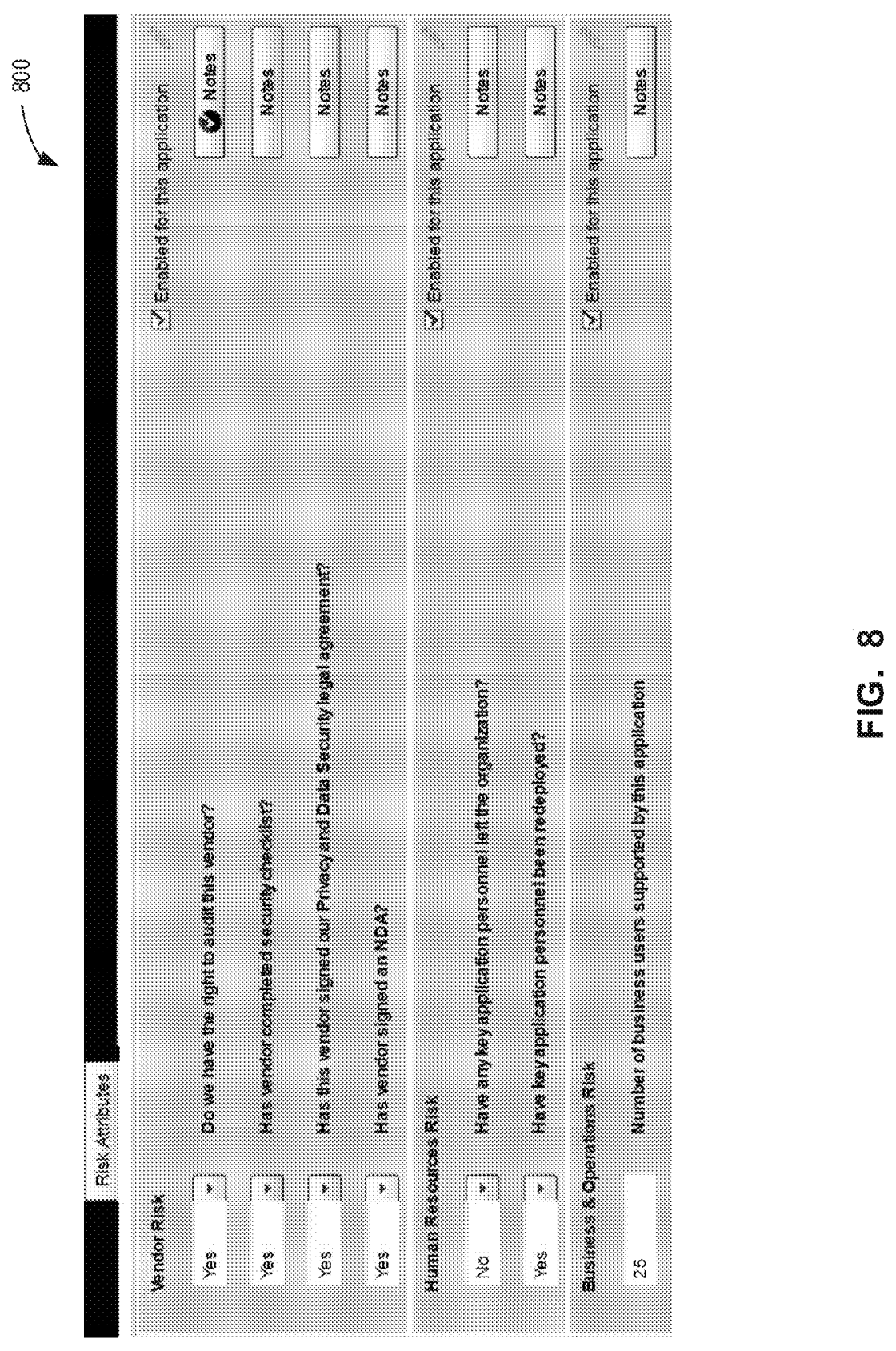

Referring briefly to FIG. 8, there is illustrated an example risk attribute display, such as may be generated in a dashboard view of RAS 150 or risk assessment viewer application 218.

Display 800 illustrates an input graphical user interface for the provision of sample attributes by a user, with regard to a hypothetical application. For example, given the Vendor Security Checklist question shown in FIG. 7, the answer in this case is "yes" as indicated by the corresponding dropdown dialog box, so no risk points will have been added. For the Privacy and Data Security question, the answer is also "yes", so 10 points will have been deducted from the overall score.

Referring briefly to FIG. 9, there is illustrated an example risk score calculation display, such as may be generated in a dashboard view of RAS 150 or risk assessment viewer application 218.

Display 900 reveals the elements considered in computing an example organizational risk score. For each software application or organizational node, the RAS 150 can compare the entered application data against the System Rules (e.g., as described with reference to FIG. 6). For any rule that applies, points can be added to the cumulative score. Then, for each answer to each applicable master risk attribute question (an example of which is shown in FIG. 8), points can be added or subtracted accordingly to the scores laid out in the master attribute scores list (an example of which is shown in FIG. 7). In some cases, display 900 may only show those questions that have resulted in non-zero point calculations. As shown in display 900, the overall risk score for one example software application can be calculated as 10+(−10)+5+10+15+10=40.

Figure 10:
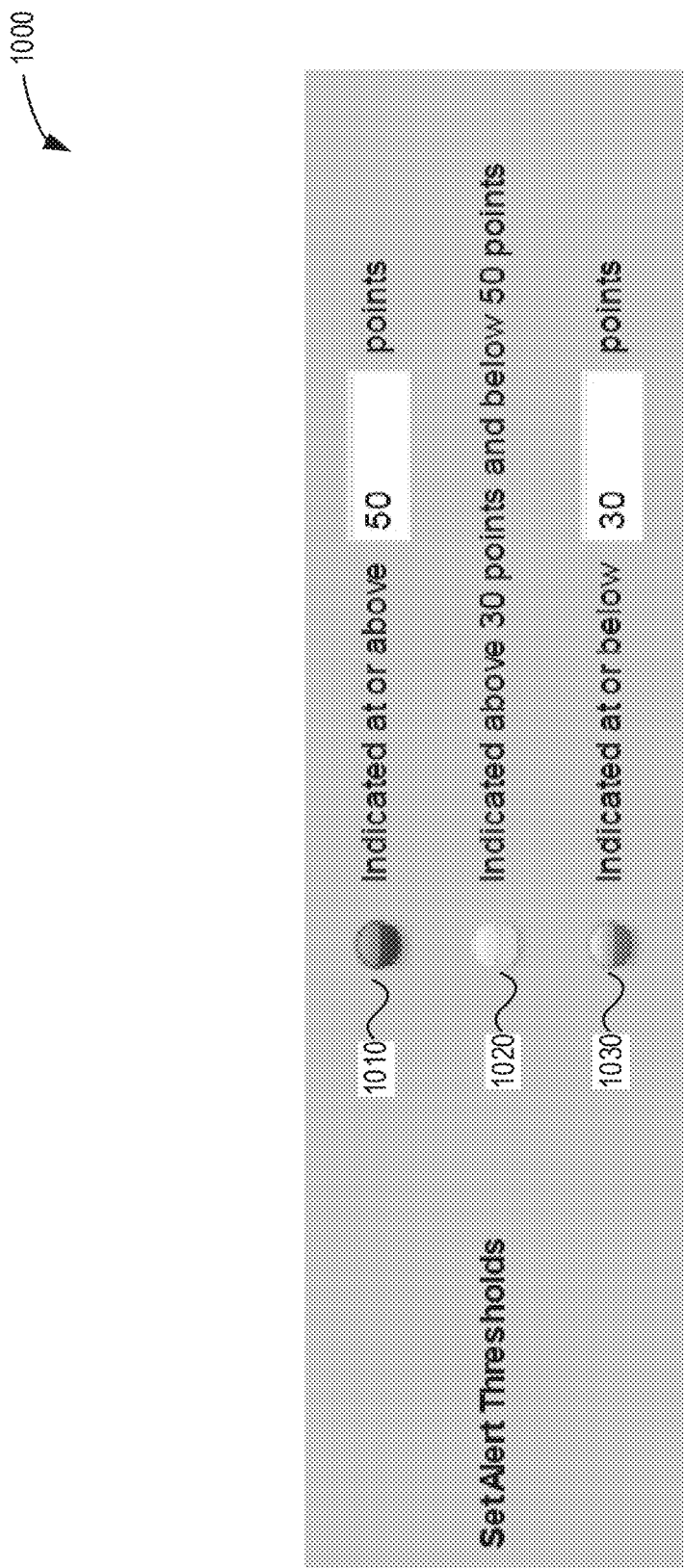
FIG. 10 illustrates an example organizational risk thresholds display in accordance with an example embodiment.

Referring briefly to FIG. 10, there is illustrated an example risk threshold display, such as may be generated in a dashboard view of RAS 150 or risk assessment viewer application 218.

Display 1000 contains buttons 1010, 1020, 1030, which can be shaded in various colors to quickly convey meaning. Alternatively, the buttons may use different shapes or labels to communicate meaning. As depicted in FIG. 10, the buttons depict colored buttons, specifically, a Red button 1010, a Yellow button 1020, and a Green button 1030. The arrangement of display 1000 can be used to indicate that the organization wishes to flag any application with a risk score equal to or greater than 50 with a red button, indicating a high risk that needs to be examined. A score equal to or less than 30 may result in a Green indication, signaling a low risk application. By default for this example, a score between 31 and 49 would result in a Yellow indication, which corresponds to a medium risk. These thresholds are for illustrative purposes only; other organizations may have different thresholds.

Figure 11:
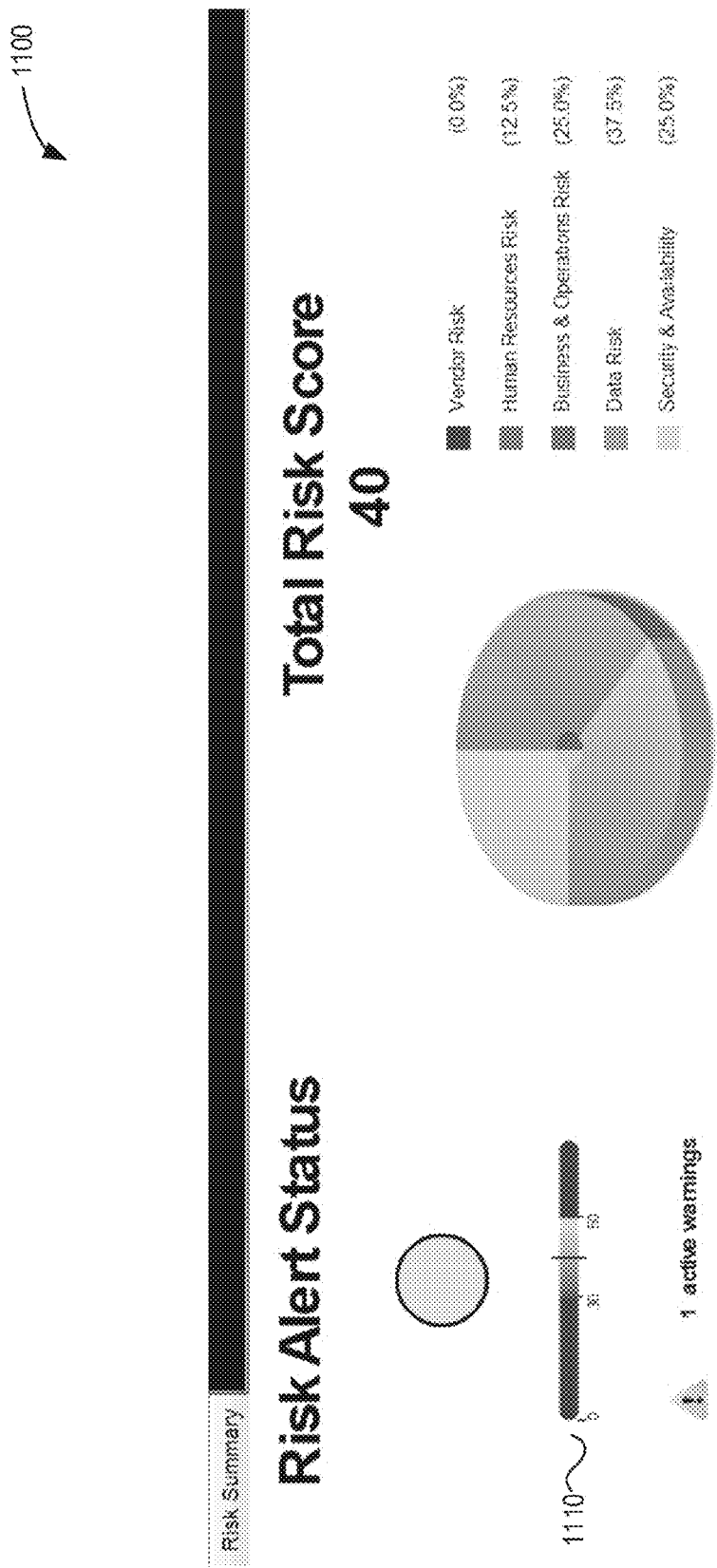
FIG. 11 illustrates an example summary comparative risk score display in accordance with an example embodiment.

Referring briefly to FIG. 11, there is illustrated an example overall score calculation display, such as may be generated in a dashboard view of RAS 150 or risk assessment viewer application 218.

Display 1100 illustrates one example of how the overall score can be presented to show risks by categories, the overall score, and a visual representation of the score in a data-centric and succinct manner. Display 1100 may also contain a color-graded bar indicator 1110, which has a vertical bar indicator to visually depict placement of the computed risk score (i.e., 40, in this case), within a color gradient from green (0-30), to yellow (31-49), and red (50 and above). The color gradient can be representative of possible risks.

Referring again to FIG. 3, at 340, the RAS 150 may iterate through the list of organizational nodes, and determine an organizational node risk assessment score for each organizational node based on the properties corresponding to the selected organizational nodes. In some embodiments, the risk assessment score for an organizational node may be determined by summing or otherwise combining the risk assessment scores of all of the software applications that the node has access to, based on the links recorded in the organizational node's relevant properties. In any of the above situations an authorized user may further assign weights or fine tune the scores.

For example, the calculation of the risk score for the organizational node represented as Organizational Unit 1 in FIG. 4 may be performed as follows: 1) sum the risk scores for Application 1 and Application 2, to determine the risk score for Service 1; and 2) sum the scores for the directly dependent components Service 1 and Application 3. Thus the risk score for Organizational Unit 1 is the sum of the risk scores for Application 1, Application 2, and Application 3.

At 345, the RAS 150 may determine a composite risk assessment score for the subscriber organization based on the respective software application risk assessment scores of each of the list of software applications and respective organizational node risk assessment scores of each of the list of organizational nodes.

The composite risk assessment score may be computed in a variety of manners. In one example, the composite risk assessment score is an average of the software application risk assessment scores and organizational node risk assessment scores determined for the organization. In other examples, the composite risk assessment score may be a weighted average, a straight sum, a product, a weighted product, or other computation suitable to provide a simple score.

A composite score, or overall cybersecurity preparedness score may be calculated out of a possible 100 points by the mechanism of assigning different point scored to a series of different logical calculations on the overall risk data. The exact questions and scoring used may vary from organization to organization, although the overall mechanism can remain the same.

For example, a sample calculation for an organization may take the form of a rule set, such as:
add 10 points if total apps tracked is greater than or equal to predetermined value
add 10 points if at least predetermined number of crown jewel apps tracked
add 10 points if average days since assessed is less than 365 for crown jewel applications
add 10 points if average days since assessed is less than 240 for crown jewel applications
add 5 points if 25% of crown jewel apps have a current assessment
add 5 points if 25% of crown jewel apps have a current assessment
add 5 points if 50% of crown jewel apps have a current assessment
add 5 points if 75% of crown jewel apps have a current assessment
add 5 points if 90% of crown jewel apps have a current assessment
add 10 points if average crown jewel application risk score is less than threshold that organization set for red
add 10 points if number of interfaces tracked is greater than 5
add 10 points if number of services tracked is greater than 2
add 5 points if number of crown jewel applications whose risk scored exceed red target is less than 10%

In some embodiments, there may also be internally implemented "system rules" within RAS 150, which can be configured to automatically generate a risk assessment score for an application, or a property or risk attribute of the application, based on evaluation of a set of conditional statements about the obtained answers to one or more questions about the application. For example, a system rule may be: "if the end-of-life date is in the past, and current-road-map-status is not 'retired', then set the score to X". Some of these rules may be standard within the subscriber organization's industry, and more may be defined and added by the organization as desired.

When a risk model is initially created, the composite risk assessment score may be anomalous, owing to initial weights. It may be beneficial to iterate the composite risk assessment score one or more times until the composite risk assessment score converges or settles on a value.

Even after a risk model is settled, it may be desirable to periodically update risk assessment scores, therefore after a predetermined wait period, which can be specified by the organization, RAS 150 may update risk assessment scores in the event that the list of software applications, the list of organizational nodes or their respective properties have changed. In other embodiments, the update may be automatically triggered by a change in the list of software applications, the list of organizational nodes or their respective properties.

At 355, RAS 150 may determine whether any risk assessment score rises above a predefined threshold that relates to one or more of the software application risk assessment scores, the organizational node risk assessment scores, and the risk assessment score for the subscriber organization. If a risk assessment score rises above a predefined threshold, RAS 150 may generate and transmit an alarm or notification at 360 to remote subscriber computer 210. The notification may have a link that, when activated, activates the risk assessment viewer application of the remote subscriber computer 210 and causes the notification to display on the remote subscriber computer and to enable connection via the link to RAS 150 to obtain a risk assessment report about the subscriber organization.

In some embodiments, RAS 150 may enter into a poll loop, waiting a predetermined period such as 1 hour or 1 day, at 365, and polling for changes in the list of software applications, list of organizational nodes or their respective properties, at 370. If there are no changes, RAS 150 may return to waiting at 365. Otherwise, RAS 150 may re-generate risk assessment scores, beginning at 335. In some cases, RAS 150 may re-generate only those risk assessment scores that have been rendered stale by the detected changes.

Most organizations beyond a certain size will have formal change control processes relating to software applications and organizational nodes. Generally, change control involves: documentation and formally approval prior to implementation; separation of development from implementation; restricting developers from production environments; and strict adherence to formal procedures.

Change control can assist in determining if a change has affected applications that access crown jewel data. In particular, change control procedures can be updated to require updating of the organizational risk model if a change has the potential to impact crown jewel data.

In some embodiments, the data used to compute risk assessment scores, such as the list of software applications and their respective properties and the list of organizational nodes and their respective properties need not be input manually, but instead may be automatically imported from other systems, or through automated "watchdog" agents that monitor application operations and changes. This may enable near real-time, continuous and automated detection of application changes and notification of relevant information to, for example, organizational decision makers in a way that can allow them to make timely and effective risk management decisions.

It will be appreciated that various acts of method 300 may be combined or performed in a different order while still providing the same functionality. For example, organizational nodes may be processed prior to software applications, or risk scores may be computer at different times, or periodically at predetermined intervals.

Figure 4:
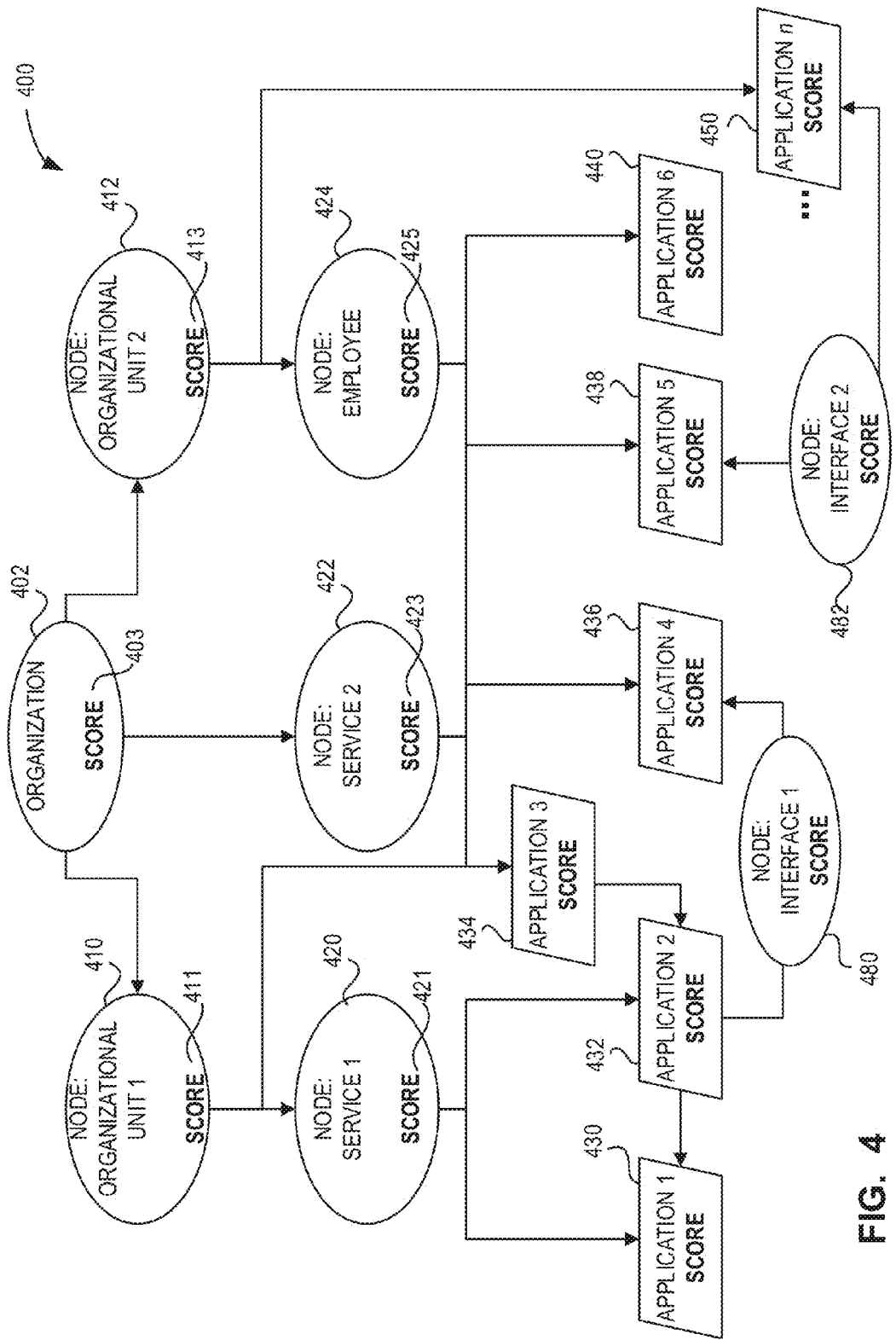
FIG. 4 illustrates an example schematic risk model diagram in accordance with an example embodiment.

Referring now to FIG. 4, there is provided an example schematic risk model diagram generated by a RAS, such as RAS 150. Risk model diagram 400 is one example map showing the relationships between crown jewel data, software applications and other organizational nodes. In some cases, risk model diagram 400 may be one of multiple diagrams generated by RAS 150 for display to a user, and may be interactive when viewed through a GUI provided by RAS 150 or remote subscriber computer 210 (e.g., via risk assessment viewer application 218).

In the example of FIG. 4, organizational nodes include services provided by the organization, organizational units or divisions, software applications, and the interfaces between software applications.

Organizational node 402 represents the organization itself and therefore, the score indication 403 may indicate the composite risk assessment score for the organization.

Organizational node 402 is linked to organizational nodes 410 and 412, each of which represent an organizational unit or subdivision of the organization. Organization node 402 is directly linked to organizational node 422, which represents a service provided by the organization.

Similarly, organizational node 410 is linked to organizational node 420, which represents a service provided by the organizational unit.

Organizational node 412 is linked to organizational node 424, which represents a particular employee of the organization.

Organizational nodes can be further linked to software applications 430, 432, 434, 436, 438, 440, 450 and so on.

Organizational nodes 480 and 482 represent interfaces between software applications. For example, organizational node 480 links software application 432 with software application 436, to represent that data from software application 432 is associated with (e.g., input to) software application 436. In some cases, data flow may be bidirectional. In some cases, software applications may have multiple interfaces.

It will be appreciated that risk model diagram 400 demonstrates but one example of a risk model. Risk models will inherently be different for each organization.

In some cases, each element in the risk model diagram may also display an indication of the risk assessment score for the element, as depicted by score indications 403, 411, 413, 421, 423, 425 and so on. In some other cases, the risk assessment score may be hidden from view initially, and can be displayed when the element is interacted with via a GUI.

Figure 5:
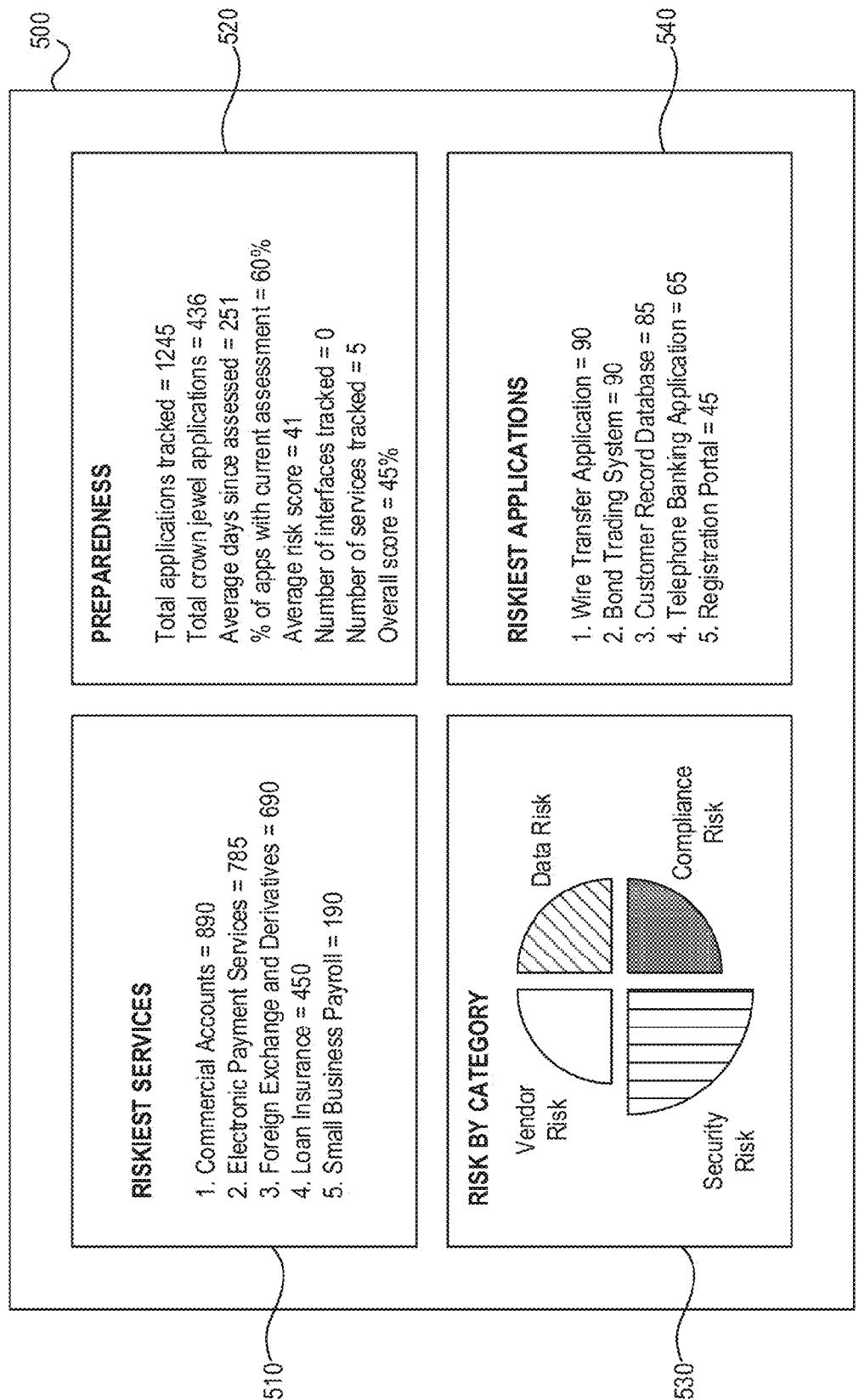
FIG. 5 illustrates an example report display in accordance with an example embodiment.

Likewise, RAS 150 may output risk assessment scores in a variety of formats. For example, risk assessment scores can be embedded in an interactive relationship map (as shown in FIG. 4), in dashboards (as shown in FIG. 5), in the form of report documents, or in the alarms or notifications transmitted to remote subscriber computer (e.g., when predefined thresholds are exceeded). In some embodiments, representations of the risk assessment scores may adopt a color scheme, for example, use of the color green may indicate low risk, yellow may indicate that attention is needed, and red may indicate a high risk.

In some embodiments, the risk model diagram 400 may be filtered to output or display only those software applications or organizational nodes that have been identified as having access to crown jewel data.

In some embodiments, applications or entities may be filtered based on any properties of the software applications or organizational nodes. For example, properties indicating whether the application is a cloud-based application, whether the application is custom developed, or what platform the application uses. The properties of the software applications may be manually provided. In some cases, properties for filtering may also be automatically imported from other systems or from watchdog monitors.

Referring now to FIG. 5, there is illustrated an example report display, such as may be generated in a dashboard view of RAS 150 or risk assessment viewer application 218.

As shown, dashboard display 500 contains several subdivisions to enable easy visualization of key risk assessment metrics. In a first portion 510 there is provided a ranked list of the organizational nodes with the highest risk. In this example, the ranked list is limited to services provided by the organization.

In a second portion 520, there is provided a summary of the organization's cybersecurity preparedness. The summary includes metrics such as the total number of known software applications, the total number of software applications with access to crown jewel data, the average days since access, the number of software applications with an up-to-date risk assessment score, the average risk assessment score, the number of interfaces tracked, and the number of organizational services tracked. The composite risk assessment score may also be tracked, in this case shown as a percentage value.

In a third portion 530, a chart may be shown illustrating categories with the greatest risk. In this case, the chart is a pie chart with segments representing data risk, vendor risk, compliance risk, organizational risk and security risk.

In a fourth portion 540, a ranked list of the software applications with the highest risk assessment scores can be displayed. In some embodiments, each entry in the list may have a corresponding color-graded "heat bar" to illustrate the degree of relative risk apportioned to each software application.

In general, the described embodiments enable fast and easy risk management assessment for organizations, allowing them to reduce the probability and impact of cybersecurity breaches, to protect their most important crown jewel data and information assets, and to recover faster in the event of a breach.

The described embodiments employ an agile approach that uses small amounts of input data to predict risk levels and cybersecurity preparedness. Specifically, the invention uses the properties of an organization's individual software applications to predict the overall cybersecurity risk and uses the mapping of applications to the organization's services to predict impact. This approach is in contrast to traditional risk management systems that require vast amounts of data and complex impact models, which can hinder collection of assessment data and therefore prevent accurate assessment. They also are used to provide benchmarking, by comparing risk and preparedness scores to other users of the invention, while maintaining confidentiality and while normalizing for organization size, industry and threat model.

Risk scoring of software applications leads to an overall score of the total risk and residual risk for each application. These scores can be compared and presented in dashboards for users to identify the highest risk applications and the greatest threats to crown jewel data. Visual maps also show how risks roll up and carry through to the various organizational services and processes.

Changes can be captured in near real-time as software applications are added or updated, and as services are updated. This results in continuous risk tracking and management.

The small amounts of data required mean that an organization can establish an initial risk assessment quickly, then easily keep it current and expand over time if necessary.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

We claim:

1. A method of determining and distributing a network security risk assessment for a subscriber organization network to a remote subscriber computer, the method comprising:
    providing a risk assessment viewer application to the remote subscriber computer;
    providing a risk assessment server to the subscriber organization network, the risk assessment server comprising a processor and a memory;
    receiving, at the risk assessment server:
        a list of software applications operating within the subscriber organization network;
        a plurality of properties for each of the software applications, wherein each property in the plurality of properties for each of the software applications is indicative of accessibility of predetermined critical data within the subscriber organization network; and
        a list of organizational nodes within the subscriber organization; and
        a plurality of properties for each of the organizational nodes, wherein each property in the plurality of properties for each of the organizational nodes is indicative of access to at least one of the list of software applications;
    storing the list of software applications, the plurality of properties for each of the software applications, the list of organizational nodes, and the plurality of properties for each of the organizational nodes in the memory;
    for each selected software application in the list of software applications, determining a software application risk assessment score for the selected software application based on the plurality of properties corresponding to the selected software application;
    for each selected organizational node in the list of organizational nodes, determining an organizational node risk assessment score for the selected organizational node based on the plurality of properties corresponding to the selected organizational node;
    determining a risk assessment score for the subscriber organization based on respective software application risk assessment scores of each of the list of software applications and respective organizational node risk assessment scores of each of the list of organizational nodes;
    transmitting a notification to the remote subscriber computer when a predefined reporting threshold is exceeded, wherein the predefined reporting threshold relates to one or more of the software application risk assessment scores, the organizational node risk assessment scores, and the risk assessment score for the subscriber organization, wherein the notification comprises a link that, when activated, activates the risk assessment viewer application to cause the notification to display on the remote subscriber computer and to enable connection via the link to the risk assessment server to obtain a risk assessment report about the subscriber organization.

2. The method of claim 1, wherein the list of organizational nodes comprises at least one of a service identifier, an organizational unit identifier and an employee identifier.

3. The method of claim 1, wherein one of the plurality of properties for each of the list of software applications is indicative of Internet-accessibility.

4. The method of claim 1, wherein one of the plurality of properties for each of the list of software applications is indicative of third-party origin.

5. The method of claim 1, wherein one of the plurality of properties for each of the list of software applications is indicative of data encryption.

6. The method of claim 1, wherein each property of each of the list of software applications comprises a numeric score value.

7. The method of claim 6, wherein the risk assessment score is determined by, for each respective property of the software application:
   retrieving the numeric score value of the respective property; and
   applying a weight factor to the numeric score value of the respective property to obtain a weighted score for the respective property; and
   adjusting the risk assessment score based on the weighted score of each respective property.

8. The method of claim 7, wherein the organizational node risk assessment score for each respective organizational node is adjusted based on the software application risk assessment score of each software application to which the respective organizational node is connected.

9. The method of claim 1, further comprising generating a risk model for the subscriber organization, the risk model specifying interconnection weights between each of the list of software applications and each of the list of organizational nodes.

10. The method of claim 9, wherein the risk assessment report comprises a visual representation of the risk model.

11. A network security risk assessment system, the system comprising:
   a remote subscriber computer;
   a risk assessment viewer application stored in a memory of the remote subscriber computer;
   a risk assessment server within a subscriber organization network connected to the remote subscriber computer, the risk assessment server comprising: a memory, at least one network interface; and a processor coupled to the memory for electronic communication therewith, the processor configured to:
      receive a list of software applications operating within the subscriber organization network;
      receive a plurality of properties for each of the software applications, wherein each property in the plurality of properties for each of the software applications is indicative of accessibility of predetermined critical data within the subscriber organization network; and
      receive a list of organizational nodes within the subscriber organization; and
      receive a plurality of properties for each of the organizational nodes, wherein each property in the plurality of properties for each of the organizational nodes is indicative of access to at least one of the list of software applications;
      store the list of software applications, the plurality of properties for each of the software applications, the list of organizational nodes, and the plurality of properties for each of the organizational nodes in the memory;
      for each selected software application in the list of software applications, determine a software application risk assessment score for the selected software application based on the plurality of properties corresponding to the selected software application;
      for each selected organizational node in the list of organizational nodes, determine an organizational node risk assessment score for the selected organizational node based on the plurality of properties corresponding to the selected organizational node;
      determine a risk assessment score for the subscriber organization based on respective software application risk assessment scores of each of the list of software applications and respective organizational node risk assessment scores of each of the list of organizational nodes;
      transmit a notification to the remote subscriber computer when a predefined reporting threshold is exceeded, wherein the predefined reporting threshold relates to one or more of the software application risk assessment scores, the organizational node risk assessment scores, and the risk assessment score for the subscriber organization, wherein the notification comprises a link that, when activated, activates the risk assessment viewer application to cause the notification to display on the remote subscriber computer and to enable connection via the link to the risk assessment server to obtain a risk assessment report about the subscriber organization.

12. The system of claim 11, wherein the list of organizational nodes comprises at least one of a service identifier, an organizational unit identifier and an employee identifier.

13. The system of claim 11, wherein one of the plurality of properties for each of the list of software applications is indicative of Internet-accessibility.

14. The system of claim 11, wherein one of the plurality of properties for each of the list of software applications is indicative of third-party origin.

15. The system of claim 11, wherein one of the plurality of properties for each of the list of software applications is indicative of data encryption.

16. The system of claim 11, wherein each property of each of the list of software applications comprises a numeric score value.

17. The system of claim 16, wherein the risk assessment score is determined by, for each respective property of the software application:
   retrieving the numeric score value of the respective property; and
   applying a weight factor to the numeric score value of the respective property to obtain a weighted score for the respective property; and
   adjusting the risk assessment score based on the weighted score of each respective property.

18. The system of claim 17, wherein the organizational node risk assessment score for each respective organizational node is adjusted based on the software application risk assessment score of each software application to which the respective organizational node is connected.

19. The system of claim 11, wherein the microprocessor generates a risk model for the subscriber organization, the risk model specifying interconnection weights between each of the list of software applications and each of the list of organizational nodes.

* * * * *